United States Patent
Joly et al.

(10) Patent No.: US 12,005,924 B2
(45) Date of Patent: Jun. 11, 2024

(54) DYNAMIC ROUTE RECOMMENDATION BASED ON MOBILE COMPUTATION

(71) Applicant: International Business Machines Corporation, Armonk, NY (US)

(72) Inventors: Nicolas Jean-Baptiste Joly, Brooklyn, NY (US); Daniel De Souza Casali, Elmhurst, NY (US); Abhishek Jain, Baraut (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 17/304,133

(22) Filed: Jun. 15, 2021

(65) Prior Publication Data

US 2022/0396288 A1 Dec. 15, 2022

(51) Int. Cl.
*B60W 60/00* (2020.01)
*G01C 21/34* (2006.01)
(Continued)

(52) U.S. Cl.
CPC ...... *B60W 60/0011* (2020.02); *B60W 60/001* (2020.02); *B60W 60/0021* (2020.02);
(Continued)

(58) Field of Classification Search
CPC ............ G01C 21/3415; G01C 21/3453; G01C 21/3461; G06F 9/5061; G06F 9/5083;
(Continued)

(56) References Cited

U.S. PATENT DOCUMENTS

| 10,915,914 B2* | 2/2021 | Viswanathan ......... G07C 5/008 |
| 2011/0137551 A1* | 6/2011 | Peri ..................... G01C 21/3453 |
| | | 701/533 |

(Continued)

FOREIGN PATENT DOCUMENTS

| EP | 3591637 | * | 1/2020 | ....... G06Q 10/06315 |
| EP | 3591637 A1 | * | 1/2020 | ....... G06Q 10/06315 |
| WO | 2020227435 A1 | | 11/2020 | |

OTHER PUBLICATIONS

Haleem, Amir, Allen, Andrew, Thompson, Andrew, Nijdam, Marc, and Garg, Rahul. "Helium: A Decentralized Wireless Network". Nov. 14, 2018. (Year: 2018).*

(Continued)

*Primary Examiner* — Vivek D Koppikar
*Assistant Examiner* — Godfrey Aleksander Maciorowski
(74) *Attorney, Agent, or Firm* — Joseph P. Curcuru

(57) ABSTRACT

In an approach to improve mobile computation while traveling by dynamically generating one or more routes base on computing resource requirements of one or more endpoint devices. Embodiments identify, in real time, a plurality of autonomous vehicles, wherein the plurality of autonomous vehicles are traveling along a common route. Further embodiments, adjust, in real time, relative positions and speeds of the plurality of autonomous vehicles to maintain the plurality of autonomous vehicles within a predetermined geographic area while traveling along the common route, and wherein the predetermined geographic area is sufficient to collectively provide an amount of edge computing resources to satisfy one or more computing resource requirements of the one or more endpoint devices located within a first autonomous vehicle. Additionally, embodiments adjust, in real time, a route of the first autonomous vehicle based on (Continued)

the common route of the plurality of autonomous vehicles providing the edge computing resources.

20 Claims, 4 Drawing Sheets

(51) Int. Cl.
G05D 1/00 (2006.01)
G06F 9/50 (2006.01)
G06Q 10/0631 (2023.01)
G06Q 30/0208 (2023.01)
H04L 9/00 (2022.01)
H04W 4/46 (2018.01)

(52) U.S. Cl.
CPC ..... *G01C 21/3415* (2013.01); *G01C 21/3453* (2013.01); *G01C 21/3461* (2013.01); *G01C 21/3492* (2013.01); *G05D 1/0027* (2013.01); *G06F 9/5061* (2013.01); *G06F 9/5072* (2013.01); *G06F 9/5083* (2013.01); *G05D 1/0287* (2013.01); *G06Q 10/0631* (2013.01); *G06Q 30/0208* (2013.01); *H04L 9/50* (2022.05); *H04W 4/46* (2018.02)

(58) Field of Classification Search
CPC ........... G05D 1/0027; B60W 60/0011; B60W 60/001; B60W 60/0021
See application file for complete search history.

(56) References Cited

U.S. PATENT DOCUMENTS

| | | | |
|---|---|---|---|
| 2011/0231086 A1* | 9/2011 | Montealegre | G01C 21/3461 701/532 |
| 2014/0316671 A1* | 10/2014 | Okamoto | G08G 1/22 701/96 |
| 2015/0345951 A1* | 12/2015 | Dutta | G01C 21/3605 701/400 |
| 2017/0349176 A1* | 12/2017 | Alden | H04W 4/44 |
| 2018/0059684 A1* | 3/2018 | Hadfield | G05D 1/0287 |
| 2018/0164110 A1* | 6/2018 | Shirai | G01C 21/20 |
| 2018/0294665 A1* | 10/2018 | Chandan | H02J 3/28 |
| 2018/0300964 A1* | 10/2018 | Lakshamanan | G06F 9/5027 |
| 2019/0041853 A1* | 2/2019 | Jain | G05D 1/0287 |
| 2019/0086217 A1* | 3/2019 | Ibrahim | H04W 88/02 |
| 2020/0097331 A1* | 3/2020 | Boehm | G06F 12/1433 |
| 2020/0201674 A1* | 6/2020 | McSchooler | G05D 1/0027 |
| 2020/0314614 A1 | 10/2020 | Moustafa | |
| 2020/0336375 A1 | 10/2020 | Ucar | |
| 2021/0174678 A1* | 6/2021 | Wright | G06Q 30/0226 |
| 2022/0179411 A1 | 6/2022 | Joly | |

OTHER PUBLICATIONS

Haleem, Amir, Allen, Andrew, Thompson, Andrew, Nijdam, Marc, and Garg, Rahul. "Helium: A Decentralized Wireless Network". Nov. 14, 2018. (Year: 2018) (Year: 2018).*

Dressler et al., "Virtual Edge Computing using Vehicular Micro Clouds", 2019 International Conference on Computing, Networking and Communications (ICNC) Feb. 18-21, 2019, 5 pages.

* cited by examiner

DYNAMIC ROUTE RECOMMENDATION BASED ON MOBILE COMPUTATION

BACKGROUND OF THE INVENTION

The present invention relates generally to the field of autonomous vehicles, and more particularly to dynamically predict the computing resource requirement and recommend appropriate routes for a vehicle while a user is traveling.

Edge computing is an evolved and more-efficient form of cloud computing. In edge computing, one or more computations will be performed at the edge of the network instead of a centrally managed platform. The biggest advantage of edge computing over cloud computing is the number of operations required by the client to reach and transfer data from the server. Edge computing distributes data processes across different locations, which makes the data deliverable to the nearest node and processing at the edge. However, when it comes to being powerful in terms of processing, cloud infrastructures are preferred over edge computing. Content Delivery Network (CDN) architecture exist to improve connectivity, but when CDN was created, the idea was to bring content to more areas in the world and not necessarily provide local computing resources. Using a CDN for website content delivery became a widespread idea in the early 90s and using a CDN for websites or other functions such as data sharing and application hosting was soon adopted by many enterprises. Now, CDN architecture can be used by anyone who wishes to reach others across the globe and CDN for website delivery is used by most global companies. For example, a video CDN for websites improves streaming quality, an image CDN for websites calculates how images will appear in different gadgets, and a traffic CDN for websites manages data exchange in and out of the CDN architecture. Edge computing is more concerned with bringing processes closer to the devices that need them, whereas CDN is more focused on content (data) rather than processes, but the distinction between the two is now becoming irrelevant with the advent of modern technology like cheap storage and cheap computing power.

SUMMARY

Embodiments of the present invention disclose a computer-implemented method, a computer program product, and a system for dynamic route generation based on computing resource requirements of one or more endpoint devices, the computer-implemented method comprising: identifying, in real time, a plurality of autonomous vehicles, wherein the plurality of autonomous vehicles are traveling along a common route; adjusting, in real time, relative positions and speeds of the plurality of autonomous vehicles to maintain the plurality of autonomous vehicles within a predetermined geographic area while traveling along the common route, wherein each of the plurality of the autonomous vehicles comprise an edge computing device, and wherein the predetermined geographic area is sufficient to collectively provide an amount of edge computing resources to satisfy one or more computing resource requirements of the one or more endpoint devices located within a first autonomous vehicle; and adjusting, in real time, a route of the first autonomous vehicle based on the common route of the plurality of autonomous vehicles providing the edge computing resources.

DETAILED DESCRIPTION

Figure 1:
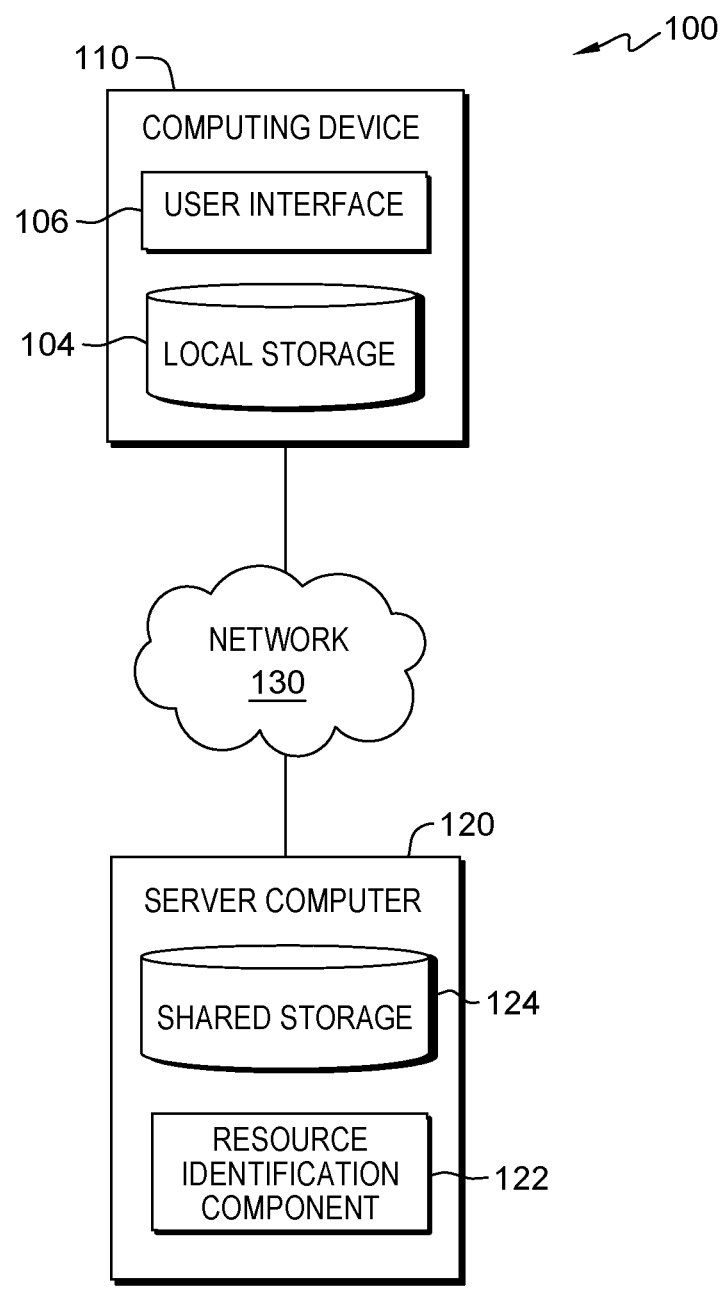
FIG. 1 is a functional block diagram illustrating a distributed data processing environment, in accordance with an embodiment of the present invention.

Embodiments of the present invention recognize that various autonomous vehicles may travel within or through a city or town, wherein an intelligent transport system can manage the flow of autonomous vehicle systems based on the public transport requirement in the city. An intelligent transportation system is an advanced application which aims to provide innovative services relating to different modes of transport and traffic management and enable users to be better informed and make safer, more coordinated, and 'smarter' use of transport networks. Some of these technologies, associated with intelligent transportation systems, comprise: calling for emergency services when an accident occurs, and using cameras to enforce traffic laws or signs that mark speed limit changes depending on conditions. Further, an intelligent transportation system may be defined as one or more systems in which information and communication technologies are applied in the field of road transport, including infrastructure, vehicles and users, and traffic management and mobility management, as well as for interfaces with other modes of transport. Intelligent transportation systems may improve the efficiency and safety of transport in a number of situations, (e.g., road transport, traffic management, and mobility).

Embodiments of the present invention recognize that autonomous driving vehicles bring a new ecosystem to the public transport methods with the cost of huge data generation and consumption of this data. Embodiments of the present invention recognize that autonomous vehicle ecosystem communication occurs through (i) communication between cars or with traffic management infrastructure, and/or (ii) communication between vehicle occupants and the outside world. Embodiments of the present invention recognize that autonomous vehicles can be managed by an intelligent public transportation system (e.g., intelligent transportation system) based on the vehicle requirements in multiple regions of the city. Embodiments of the present invention recognize that an intelligent public transportation system may help a city (e.g., a smart city) in solving an infrastructure problem introduced by edge computing, where installing edge computing servers in multiple locations in a city is difficult and expensive.

Embodiments of the present invention recognize that while a person (i.e., user) is traveling in an autonomous, semi-autonomous, automatic, semi-automatic, or manual vehicle, said user might require one or more computational needs. For example, streaming videos or music while traveling or accessing an application that requires defined network latency. In this particular example, a user's experience level in regard to watching a video stream depends on the quality and speed bandwidth of the network within the service level agreement (SLA) between the user and the network provider. An SLA is a commitment between a service provider and a client, wherein particular aspects of the service quality, availability, and responsibilities are agreed between the service provider and the service user. In various embodiments, the SLA and the particular aspects of the service quality, availability, and responsibilities agreed upon between the service provider and the service user are predetermined.

Embodiments of the present invention recognize that if the network provider is highly dependent on edge network computing for delivering high bandwidth and network latency then a user does not get enough edge computing support while traveling when edge data computing resource (e.g., edge node enabled autonomous vehicle) are limited or not present on the route the user is currently traveling. In this scenario the user will not be able to perform any computational needs and the network provider will not be able to fulfill the SLA requirement resulting in the user being unsatisfied with the network provider.

Embodiments of the present invention improve the art and solve the issues stated above by identifying the network latency experience or network bandwidth availability based on the historical statistics at a given point of time in a day and the current network consumption while other users currently travel on the same route (i.e., common route) as the first user. Based on the identified data, embodiments of the present invention may recommend one or more routes that enable edge computation to be performed during travel. Embodiments of the present invention improve the art and solve the issues stated above by dynamically predicting the computing resource requirements while a user is traveling in an autonomous vehicle based on one or more service level agreements (SLAs), and recommending one or more routes for the autonomous vehicle to take (e.g., a route that comprises edge computation resources that can be served based on the SLA for computation latency).

Further, embodiments of the present invention improve the art and solve the issues stated above by (i) generating dynamic routes based on endpoint device computing resource requirements, (ii) determining computing resource requirements of an endpoint device located within a first autonomous vehicle, (iii) identifying, in real-time, a plurality of autonomous vehicles capable of providing edge computing resources traveling along a common route, (iv) adjusting, in real-time, relative positions and speeds of the plurality of autonomous vehicles to maintain the plurality of autonomous vehicles within a predetermined geographic area while traveling along the common route, wherein the predetermined geographic area is sufficient to collectively provide an amount of edge computing resources to satisfy the computing resource requirements of the endpoint device located within the first autonomous vehicle, (v) adjusting, in real-time, a route of the first autonomous vehicle based on the common route of the plurality of autonomous vehicles providing edge computing resources, (vi) adjusting, in real-time, a position and speed of the first autonomous vehicle while traveling along the adjusted route such that the first autonomous vehicle maintains a predetermined minimum distance from the predetermined geographic area of the co-located autonomous vehicles, and (vii) providing an incentive to an owner of an autonomous vehicle to alter the relative position and speed of the autonomous vehicle in order to maintain the autonomous vehicle within the predetermined geographic area, wherein the incentive is calculated as a function of an incurred delay resulting from co-locating the autonomous vehicle to the predetermined geographical area while traveling along the common route.

In various embodiments, the incentive is predetermined. Embodiments of the present invention creates an entry for a user's/vehicle's participation and duration of participation in edge computation on a blockchain ledger and uses the blockchain entries to identify which vehicles (e.g., autonomous, semi-autonomous, automatic, semi-automatic, and/or manual vehicles) are participating in edge computing and the duration of participation of each vehicle participates in edge computing to calculate a predetermined incentive, wherein the calculated predetermined incentive is distributed or credited to the user.

It should be noted herein that in the described embodiments, participating parties have consented to participating and being monitored/tracked, and participating parties are aware of the potential that such tracking and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts used to assemble the groups and/or distribute the identifiers within the crowd begin with a written notification that information about the user may be tracked, recorded, or monitored and may be saved, for the purpose of calculating and identifying computational resources, incentives, and/or navigation data. Some embodiments of the present invention include periodic reminders of the tracking, recording, and/or monitoring of the information about the user throughout the course of any such use. Additionally, it should be noted herein that any and all vehicles, in the described embodiments, should be operated in a safe manner consistent with local laws when using the mobile computational functionality described herein.

Implementation of embodiments of the invention may take a variety of forms, and exemplary implementation details are discussed subsequently with reference to the Figures (i.e., FIG. 1-FIG. 4).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices. In some embodiments, computing device 110 is integrated into a smart vehicle (e.g., an autonomous vehicle).

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 4.

User interface (interface) 106 provides an interface to the resource identification component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 4. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

In various embodiments, component 122 enables an autonomous car routing system to identify the user's travel plan and user activities. Based on the identified user travel plan and activities component 122 identifies the network bandwidth and latency requirement during the user's travel plan, which enables component 122 to identify which user activities require edge computing capability given by a network provider and whether user's SLA with the network provider is satisfied. In various embodiments, the terms and conditions of an SLA are predetermined. In some embodiments the terms and conditions of the SLA are customizable and received from a user and/or service provider. In various embodiments, component 122 issues responsive prompts, via interface 106, that prompt the user and/or service provider to acknowledge and/or agree with the received SLA. In various embodiments, if a user is traveling and is utilizing any service that requires edge computing (e.g. watching streaming video from video streaming service) then a user's autonomous vehicle, via component 122, will identify one or more routes where edge computing can be achieved during the user's current or future travel route (i.e., route).

In various embodiments, component 122, via network service providers, identifies real time network traffic condition in a plurality of routes and relays the identified real time network traffic conditions and routes to the autonomous vehicle. In some embodiments, component 122 enables a autonomous vehicle to identify real time network traffic condition in a plurality of routes. In one particular embodiment, if a user requires edge computing and a group of secondary user's in secondary vehicles are running on route A and are participating in edge computation service then component 122 will identify and select route A as the appropriate route (route) based on the identifies real time network traffic condition in a plurality of routes and user activities to satisfy the edge computing need of the users. An appropriate route is a route that has been identified to comprise the estimated required edge computing resources of a user available. In various embodiments, component 122 can identify a plurality of routes, create a ranked list of the identified routes, and output ranked list of identified routes to the user, wherein the output ranked list is a responsive prompt displayed on interface 106. In some embodiments, the route list is ranked based on predetermined factors. In other embodiments, the ranked route list may be ranked by travel time, traffic conditions (e.g., low traffic to high traffic), distance, strength of edge computing capabilities and/or any other factors known in the art.

In various embodiments, component 122 evaluates the SLA between the network provider and user (i.e., user's SLA) and latency in data processing in relation to the SLA. Component 122 may identify one or more routes for the user where the required latency in computation can be achieved with edge computation. In various embodiments, component 122 retrieves historical data about computational need during travel from shared storage 124 and/or local storage 104, and manages the traffic in different route so that the identified level of edge computation resources are available, wherein each autonomous vehicle will act like a edge computing resource. In various embodiments, component 122 identifies appropriate spacing and relative position of the vehicles on the road, so that the passengers of the vehicle can achieve a predetermined level of edge computing resources during their journey. In various embodiments, based on edge computation requirements, complexity in data processing, and volume of data component 122 dynamically adjusts the speed of the vehicles, changes the relative positions of vehicles so that the appropriate number of edge computing resources (vehicles) are available within a predetermined threshold distance. In some embodiments, the appropriate number of edge computing resources is predetermined. In other embodiments, component 122, via autonomous vehicle service providers, manages edge computing resources, wherein component 122 implements an incentive program that is dynamically offered to autonomous car service provider so that autonomous car service providers enable the addition of other vehicles on the selected route for better user's SLA.

Component 122 may create an entry for every user/vehicles participation and duration of participation in edge computation on a blockchain ledger and uses the blockchain entries to identify which vehicles (e.g., autonomous, semi-autonomous, automatic, semi-automatic, and/or manual vehicles) are participating in edge computing and the duration of participation of each vehicle participates in edge computing to calculate a predetermined incentive, wherein the calculated predetermined incentive is distributed or credited to the user. In various embodiments, each vehicle that "opts-in" to participate in edge computing and/or the incentive program will be identified uniquely and will monitored based on the blockchain ledger, wherein the amount of a predetermined incentive will be calculated based on the entries in the blockchain ledger. In some embodiments, an incentive can be priority vehicle recharging, discount in fuel recharge, service discounts, monthly payment credits, free parking, giftcards, any type of monetary compisation or credit, and/or any other type of incentive known in the art.

Figure 2:
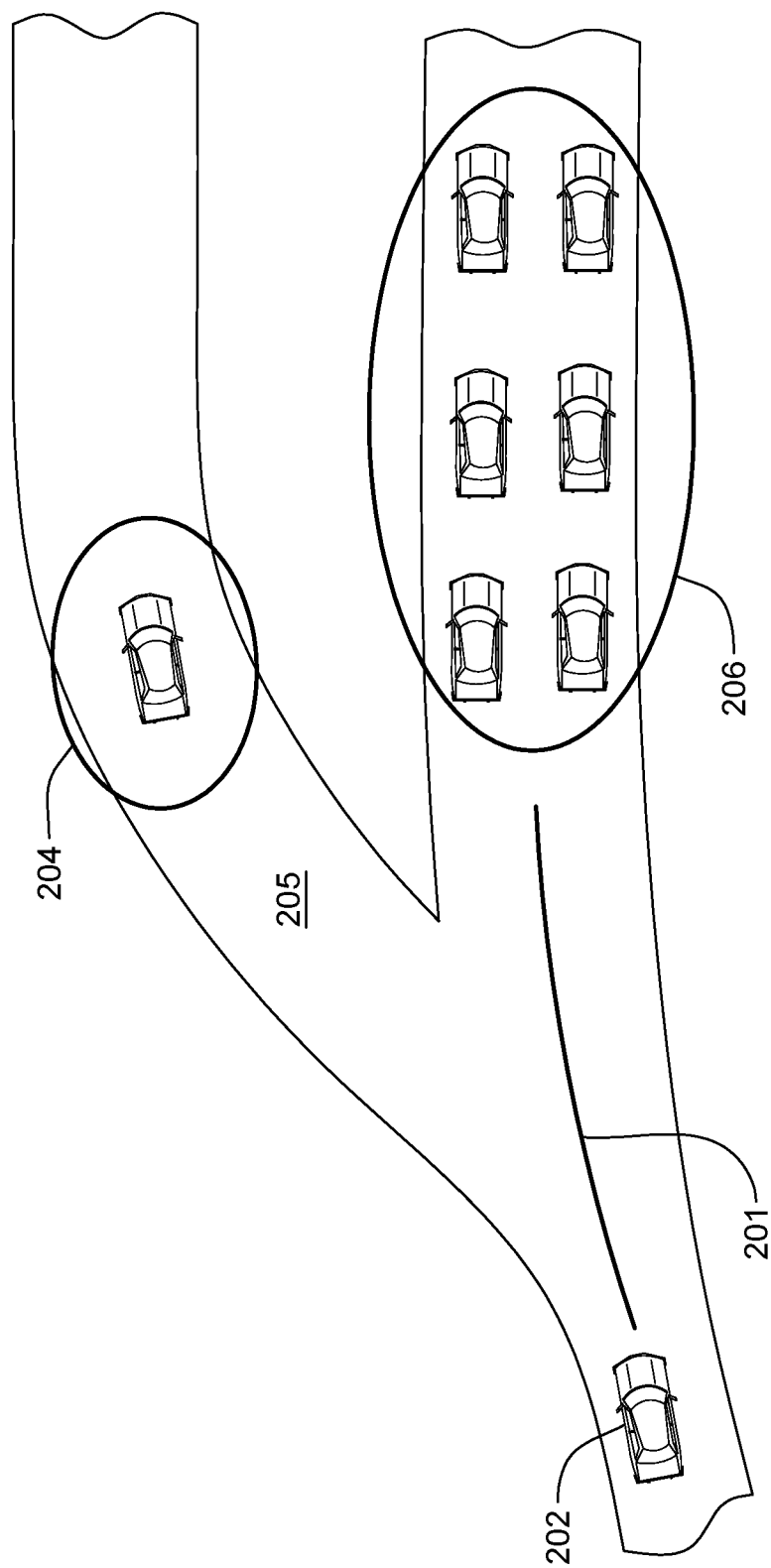
FIG. 2 an example of resource identification component predicting edge computational needs, in accordance with an embodiment of the present invention.

For example, in FIG. 2, illustrates an example of how autonomous vehicles predict edge computing needs of passengers (i.e., users) and assign an appropriate route for the vehicle so that edge computing need can be satisfied. In this example, user 202 requires a higher degree of edge computing resource to meet user 202's computational requirements. Component 122 identifies user 202's need for a higher degree of edge computing resources and searches for edge computing resources on various routes. In this example, component 122 identifies a lone vehicle in user 204 on path 205 which will not meet the degree of edge computing resources. Further, component 122 identifies users 206 on path 201, wherein users 206 comprises six vehicles. The six vehicles in users 206 are calculated by component 122 to comprises to at least meet user 202's computational requirements. Here, in this example, component 122 recommends and assigns path 201 to user 202.

In various embodiments, autonomous vehicles will comprise computing resources to perform edge computation and an intelligent autonomous vehicle traffic management system that will recognize autonomous vehicles individually and identify the position of the autonomous vehicles (e.g., direction and rate of speed). Component 122, via a traffic management system, may identify the vehicles movement path and route selection based on speed, trajectory, and position on a map. In various embodiments, based on the traffic movement pattern, component 122 predicts the number of computer resources on different routes that have selected to participate as edge computing resources. Component 122, via computing device 110 of a respective user, may predict a user's edge computing need during travel based on historical computation need during travel.

In various embodiments, component 122 identifies a user's travel needs and predicts, based on historical learning, the user's edge computation needs during travel. Component 122 may historically learn a user's edge computation needs based on historical user data stored on local storage 124 and/or local storage 104. In various embodiments, component 122 may create historical user data by actively storing user travel data to local storage 124 and/or local storage 104. User travel data comprises, but is not limited to, route, endpoint, traffic, weather, user preferences, computational usage, time of day, and/or any other travel data known in the art. In various embodiments, component 122 predicts the amount of computing resource requirements (e.g., edge computing requirement) based on the SLA with the service provider, and user's experience. Component 122 may relay the predicted computer resource requirements to the autonomous vehicle, wherein component 122 enables the autonomous vehicle to send the edge computing need to the autonomous vehicle service provider via network 130. In various embodiments, the remote autonomous vehicle service provider receive the edge computation need from different users and identify the user's destination based on the autonomous vehicles global positioning system (GPS).

The remote autonomous vehicle service provider may receive the predicted edge computing needs from a plurality of users.

In various embodiments, component 122 predicts the computing resource requirement during the user's edge computing need. Based on the predicted computing resources during edge computing component 122 may predict resource requirements and resource output potential on different routes to identify if a route meets the required resource requirement and is a viable travel route. In various embodiments, based on the destination, and edge computing need and service level agreement, component 122 predicts the edge computing resource requirements. In various embodiments, vehicles are identified and monitored based on a generated unique identification number assigned to each vehicle. Component 122, based on the unique identification number assigned to each vehicle, may identify the number of vehicles required, relative spacing among the vehicles so that edge computing resources can be made available by identifying and monitoring the edge resources of each vehicle, traffic in different identified routes, historically gathered data, and how much edge resources are required to calculate the amount of vehicles required to reach the estimated edge computing needs of the user.

Component 122 may identify one or more appropriate routes for a user based on the identified number of autonomous vehicles and relative spacing among the vehicles. In various embodiments, while assigning appropriate route component 122 may cluster the vehicles based on edge computing processing memory and assign the vehicles to routes according to a user's identified computing needs and a paths predicted resource output potential. Component 122 may evaluate the SLA related to the latency for edge computing and accordingly the position of the vehicles, relative position will dynamically be changed based on the evaluation. In various embodiments, in any contextual situation, if the edge computing needs increase, then component 122 will dynamically route the vehicle, in real time, to an appropriate place so that edge computing can be done in an effective manner. In some embodiments, component 122 may direct other vehicles to the user's path so that edge computing can be done in an effective manner.

Figure 3:
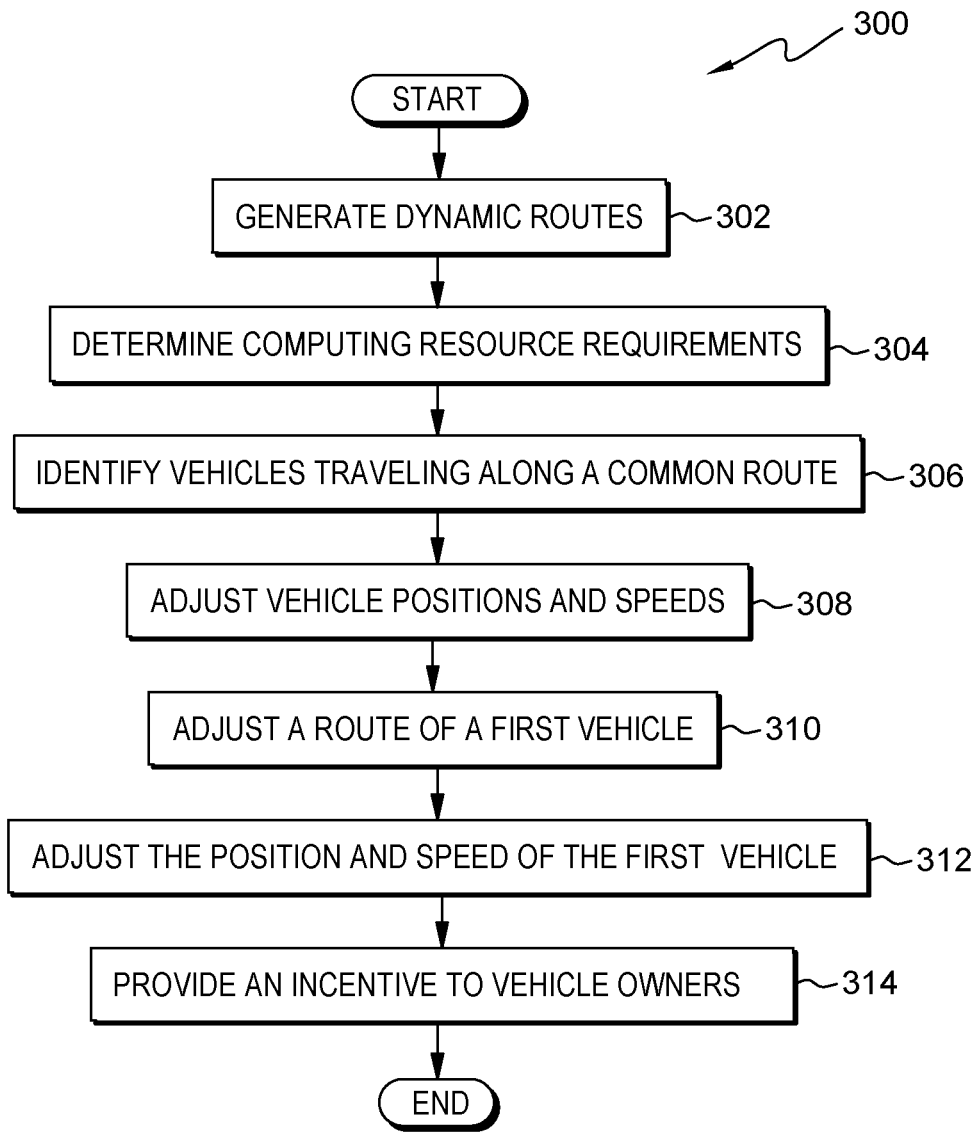
FIG. 3 illustrates operational steps of the resource identification component, on a server computer within the distributed data processing environment of FIG. 1, dynamically predicting the computing resource requirements while a user is traveling, in accordance with an embodiment of the present invention.

FIG. 3 illustrates operational steps of component 122, generally designated 300, in communication with server computer 120 and/or computing device 110, within distributed data processing environment 100 of FIG. 1, dynamically predicting the computing resource requirements while a user is traveling, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 generates dynamic routes. In various embodiments, component 122 generates dynamic routes based on endpoint device computing resource requirements.

In step 304, component 122 determines computing resource requirements. In various embodiments, component 122 determining computing resource requirements of an endpoint device located within a first autonomous vehicle.

In step 306, component 122 identifies vehicles traveling along a common route. In various embodiments, component 122 identifies, in real-time, a plurality of autonomous vehicles capable of providing edge computing resources traveling along a common route. A common route is a route that comprises one or more vehicles traveling the same route as the user. In various embodiments, the common route enables individual edge resources can be integrated.

In step 308, component 122 adjusts vehicle positions and speeds. In various embodiments, component 122 adjusts, in real-time, relative positions and speeds of the plurality of autonomous vehicles to maintain the plurality of autonomous vehicles within a predetermined geographic area while traveling along the common route, wherein the predetermined geographic area is sufficient to collectively provide an amount of edge computing resources to satisfy the computing resource requirements of the endpoint device located within the first autonomous vehicle.

In step 310, component 122 adjust a route for a first autonomous vehicle. In various embodiments, component 122 adjusts, in real-time, a route of the first autonomous vehicle based on the common route of the plurality of autonomous vehicles providing edge computing resources.

In step 312, component 122 adjusts the position and speed of the first autonomous vehicle. In various embodiments, component 122 adjusts, in real-time, a position and speed of the first autonomous vehicle while traveling along the adjusted route such that the first autonomous vehicle maintains a predetermined minimum distance from the predetermined geographic area of the co-located autonomous vehicles.

In step 314, component 122 provides an incentive to vehicle owners. In various embodiments, component 122 provides an incentive to an owner of an autonomous vehicle to alter the relative position and speed of the autonomous vehicle in order to maintain the autonomous vehicle within the predetermined geographic area, wherein the incentive is calculated as a function of an incurred delay resulting from co-locating the autonomous vehicle to the predetermined geographical area while traveling along the common route.

Figure 4:
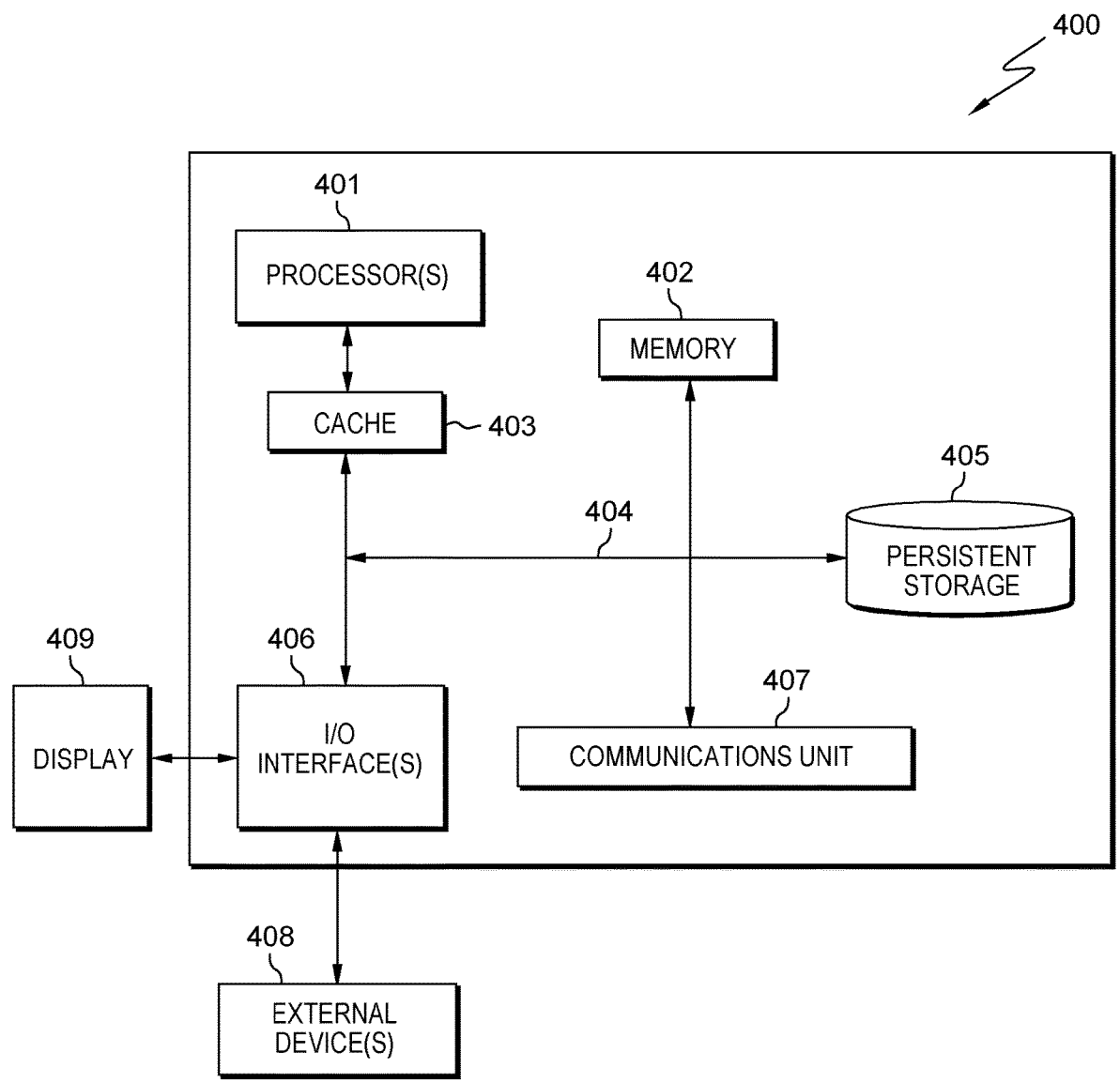
FIG. 4 depicts a block diagram of components of the server computer executing the modification component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computing 120 represents an example of computer system 400 that includes component 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors

401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamic route generation based on computing resource requirements of one or more endpoint devices, the computer-implemented method comprising:
    identifying a traffic movement pattern associated with a plurality of vehicles and a route selection based on speed, trajectory, and position on a map;
    predicting a predetermined number of computer resources on different routes that have selected to participate as edge computing resources based on the traffic movement pattern;
    identifying a network latency experience or a network bandwidth availability based on historical statistics at a given point of time in a day and a current network consumption while one or more second users currently travel on a same route;
    recommending one or more routes, based on the network latency experience or the network bandwidth, that enable edge computation to be performed during travel;
    adjusting, in real time, relative positions and speeds of the plurality of autonomous vehicles to maintain the plurality of autonomous vehicles within a predetermined geographic area while traveling along the common route, wherein each of the plurality of the autonomous vehicles comprise an edge computing device, and wherein the predetermined geographic area is sufficient to collectively provide an amount of edge computing resources to satisfy one or more computing resource requirements of the one or more endpoint devices located within a first autonomous vehicle; and
    adjusting, in real time, a route of the first autonomous vehicle based on the common route of the plurality of autonomous vehicles providing the edge computing resources.

2. The computer-implemented method of claim 1, further comprising:
    determining the one or more computing resource requirements of the one or more endpoint devices located within the first autonomous vehicle.

3. The computer-implemented method of claim 1, further comprising:
    providing an incentive to an owner of an autonomous vehicle to alter the relative position and speed of the autonomous vehicle in order to maintain the autonomous vehicle within the predetermined geographic area, wherein the incentive is priority vehicle recharging.

4. The computer-implemented method of claim 3, further comprising:
    adjusting, in real time, a position and speed of a first autonomous vehicle while traveling along the adjusted route such that the first autonomous vehicle maintains a predetermined distance from the predetermined geographic area of the co-located plurality of autonomous vehicles.

5. The computer-implemented method of claim 3, wherein providing the incentive further comprises:
    creating one or more entries in a blockchain ledger based on the incentive participation of the autonomous vehicle, wherein the entry comprises: one or more participations and a duration of participation in an edge computation by the autonomous vehicle; and
    calculating, based on the one or more blockchain entries, the incentive based on the participation and the duration of participation of the one or more vehicles in edge computing.

6. The computer-implemented method of claim 1, further comprising:
    dynamically predicting the computing resource requirements while the first user is traveling in the first autonomous vehicle based on one or more service level agreements; and
    recommending one or more common routes for the first autonomous vehicle to take, wherein the recommended one or more common routes comprise edge computation resources that can be accessed based on the one or more service level agreements for computation latency.

7. The computer-implemented method of claim 1, further comprising:
creating a ranked list of identified common routes; and
outputting, by a responsive prompt displayed on a user interface, the ranked list of the identified common routes to the first user, wherein the common route list is ranked based on predetermined factors.

8. A computer system for dynamic route generation based on computing resource requirements of one or more endpoint devices, the computer system comprising:
one or more computer processors;
one or more computer readable storage devices;
program instructions stored on the one or more computer readable storage devices for execution by at least one of the one or more computer processors, the stored program instructions comprising:
program instructions to identify a traffic movement pattern associated with a plurality of vehicles and a route selection based on speed, trajectory, and position on a map;
program instructions to predict a predetermined number of computer resources on different routes that have selected to participate as edge computing resources based on the traffic movement pattern;
program instructions to identify a network latency experience or a network bandwidth availability based on historical statistics at a given point of time in a day and a current network consumption while one or more second users currently travel on a same route;
program instructions to recommend one or more routes, based on the network latency experience or the network bandwidth, that enable edge computation to be performed during travel;
program instruction to adjust, in real time, relative positions and speeds of the plurality of autonomous vehicles to maintain the plurality of autonomous vehicles within a predetermined geographic area while traveling along the common route, wherein each of the plurality of the autonomous vehicles comprise an edge computing device, and wherein the predetermined geographic area is sufficient to collectively provide an amount of edge computing resources to satisfy one or more computing resource requirements of the one or more endpoint devices located within a first autonomous vehicle; and
program instruction to adjust, in real time, a route of the first autonomous vehicle based on the common route of the plurality of autonomous vehicles providing the edge computing resources.

9. The computer system of claim 8, further comprising:
program instruction to determine the one or more computing resource requirements of the one or more endpoint devices located within the first autonomous vehicle.

10. The computer system of claim 8, further comprising:
program instruction to provide an incentive to an owner of an autonomous vehicle to alter the relative position and speed of the autonomous vehicle in order to maintain the autonomous vehicle within the predetermined geographic area, wherein the incentive is priority vehicle recharging, discount in fuel recharge, service discounts, monthly payment credits, free parking, or monetary compensation or credit.

11. The computer system of claim 10, further comprising:
program instruction to adjust, in real time, a position and speed of a first autonomous vehicle while traveling along the adjusted route such that the first autonomous vehicle maintains a predetermined distance from the predetermined geographic area of the co-located plurality of autonomous vehicles.

12. The computer system of claim 10, wherein program instruction to provide the incentive further comprises:
program instruction to create one or more entries in a blockchain ledger based on incentive participation the autonomous vehicle, wherein the entry comprises: one or more participations and a duration of participation in an edge computation by the autonomous vehicle; and
program instruction to calculate, based on the one or more blockchain entries, the incentive based on the participation and the duration of participation of the one or more vehicles in edge computing.

13. The computer system of claim 8, further comprising:
program instruction to dynamically predict the computing resource requirements while the first user is traveling in the first autonomous vehicle based on one or more service level agreements; and
program instruction to recommend one or more common routes for the first autonomous vehicle to take, wherein the recommended one or more common routes comprise edge computation resources that can be accessed based on the one or more service level agreements for computation latency.

14. The computer system of claim 8, further comprising:
program instruction to create a ranked list of identified common routes; and
program instruction to output, by a responsive prompt displayed on a user interface, the ranked list of the identified common routes to the first user, wherein the common route list is ranked based on predetermined factors.

15. A computer program product for dynamically modifying the content of an application or a platform based on user feedback, the computer program product comprising:
one or more computer readable storage devices and program instructions stored on the one or more computer readable storage devices, the stored program instructions comprising:
program instructions to identify a traffic movement pattern associated with a plurality of vehicles and a route selection based on speed, trajectory, and position on a map;
program instructions to predict a predetermined number of computer resources on different routes that have selected to participate as edge computing resources based on the traffic movement pattern;
program instructions to identify a network latency experience or a network bandwidth availability based on historical statistics at a given point of time in a day and a current network consumption while one or more second users currently travel on a same route;
program instructions to recommend one or more routes, based on the network latency experience or the network bandwidth, that enable edge computation to be performed during travel;
program instruction to adjust, in real time, relative positions and speeds of the plurality of autonomous vehicles to maintain the plurality of autonomous vehicles within a predetermined geographic area while traveling along the common route, wherein each of the plurality of the autonomous vehicles comprise an edge computing device, and wherein the predetermined geographic area is sufficient to collectively provide an amount of edge computing resources to satisfy one or more computing resource requirements of the one or more endpoint devices located within a first autonomous vehicle; and program instruction to adjust, in real time, a route of the first autonomous vehicle based on the common route of the plurality of autonomous vehicles providing the edge computing resources.

16. The computer program product of claim 15, further comprising:
program instruction to determine the one or more computing resource requirements of the one or more endpoint devices located within the first autonomous vehicle.

17. The computer program product of claim 15, further comprising:
program instruction to provide an incentive to an owner of an autonomous vehicle to alter the relative position and speed of the autonomous vehicle in order to maintain the autonomous vehicle within the predetermined geographic area, wherein the incentive is calculated as a function of an incurred delay resulting from co-locating the autonomous vehicle with the plurality of autonomous vehicles at the predetermined geographical area while traveling along the common route;

program instruction to adjust, in real time, a position and speed of the first autonomous vehicle while traveling along the adjusted route such that the first autonomous vehicle maintains a predetermined distance from the predetermined geographic area of the co-located plurality of autonomous vehicles.

18. The computer program product of claim 17, wherein program instruction to provide the incentive further comprises:
program instruction to create one or more entries in a blockchain ledger based on incentive participation the autonomous vehicle, wherein the entry comprises: one or more participations and a duration of participation in an edge computation by the autonomous vehicle; and
program instruction to calculate, based on the one or more blockchain entries, the incentive based on the participation and the duration of participation of the one or more vehicles in edge computing.

19. The computer program product of claim 15, further comprising:
program instruction to dynamically predict the computing resource requirements while the first user is traveling in the first autonomous vehicle based on one or more service level agreements; and
program instruction to recommend one or more common routes for the first autonomous vehicle to take, wherein the recommended one or more common routes comprise edge computation resources that can be accessed based on the one or more service level agreements for computation latency.

20. The computer program product of claim 15, further comprising:
program instruction to create a ranked list of identified common routes; and
program instruction to output, by a responsive prompt displayed on a user interface, the ranked list of the identified common routes to the first user, wherein the common route list is ranked based on predetermined factors.

\* \* \* \* \*